United States Patent

[11] 3,581,795

| [72] | Inventors | G. W. Bunch, Jr.<br>3005 S.E. 147th Ave.;<br>Bruce C. Johnson, 14204 S.E. Tibetts, both of Portland, Oreg. 97236 |
|---|---|---|
| [21] | Appl. No. | 881,477 |
| [22] | Filed | Dec. 2, 1969 |
| [45] | Patented | June 1, 1971 |
| [73] | | Assignor to said Johnson, by said Bunch. |

[54] HEAVY DUTY TIRE REMOVING APPARATUS
10 Claims, 4 Drawing Figs.

[52] U.S. Cl. .................................................. 157/1.2, 157/1.28
[51] Int. Cl. ................................................. B60c 25/06
[50] Field of Search .................................... 157/1.2, 1.22, 1.24, 1.26, 1.28

[56] References Cited
UNITED STATES PATENTS
2,681,692  6/1954  Weaver .................. 157/1.2
2,762,424  9/1956  Zito ....................... 157/1.28
2,945,522  7/1960  Nelson .................. 157/1.2X

*Primary Examiner*—Granville Y. Custer, Jr.
*Attorney*—Buckhorn, Blore, Klarquist and Sparkman

ABSTRACT: An apparatus for removing a heavy duty tire from a wheel having a pedestal upon which a wheel with a tire thereon can be mounted and means for securing the wheel to the pedestal. A pair of parallel spaced coaxial pressure rings are mounted in circumscribing relation to the pedestal. A plurality of ring segments or fingers are pivotally mounted on the inner peripheral surfaces of the pressure rings. Each of the fingers has a reversely curved bead contacting portion which is adapted to slide between the beads of the tire and the rim of the wheel and contact substantially the entire bead area of the tire. The pressure rings are first lowered and then raised in fixed parallel spaced relation whereby the fingers on the upper ring separate the bead from the rim on the top side of the tire and the fingers on the lower ring separate the bead from the rim on the bottom of the tire and lift the tire from the wheel.

G. W. BUNCH, JR.
BRUCE C. JOHNSON
INVENTORS.

BY
BUCKHORN, BLORE, KLARQUIST & SPARKMAN
ATTORNEYS

PATENTED JUN 1 1971

G. W. BUNCH, JR.
BRUCE C. JOHNSON
INVENTORS.

BY
BUCKHORN, BLORE, KLARQUIST & SPARKMAN
ATTORNEYS

G. W. BUNCH, JR.
BRUCE C. JOHNSON
INVENTORS.

BY
BUCKHORN, BLORE, KLARQUIST & SPARKMAN
ATTORNEYS

G.W. BUNCH, JR.
BRUCE C. JOHNSON
INVENTORS.

BY
BUCKHORN, BLORE, KLARQUIST & SPARKMAN
ATTORNEYS

HEAVY DUTY TIRE REMOVING APPARATUS

BACKGROUND OF THE INVENTION

This invention relates to an apparatus for removing a tire from a wheel and, more particularly, to an apparatus particularly adapted to remove heavy duty tires from large wheels wherein a considerable amount of force may be required to effect a separation of the beads from the rim.

A principal object of the invention is to provide an apparatus of the type described that will be capable of removing any heavy duty tire from any rim without damaging the beads thereof. A further object of the present invention is to provide such an apparatus that will remove a heavy duty tire from a rim in a safe, quick and efficient manner.

SUMMARY OF THE INVENTION

The apparatus of the present invention comprises pedestal means upon which a wheel with a tire thereupon can be mounted and means for securing the wheel to such pedestal means. A pair of parallel spaced coaxial pressure rings are mounted in circumscribing relation to the pedestal means. A plurality of fingers are pivotally mounted on the inner peripheral surfaces of each of the pressure rings. The fingers have a reversely curved bead contacting portion and are adapted to slide between the beads of the tire and the rim of the wheel. The fingers contact substantially the entire bead area of the tire when the ring carrying them is placed adjacent the tire.

Means are provided to lower and then raise the rings in fixed parallel spaced relation whereby the fingers on the upper ring first separate the bead from the rim on the top side of the tire and then the fingers on the lower ring separate the bead from the rim on the bottom side of the tire and lift the tire from the wheel.

Means are also provided to make it possible for the bead contacting portions of the pivotally mounted fingers to be radially adjusted so that they can fit wheels of different sizes. Means are further provided to permit the bead contacting portions of the fingers to move radially inwardly during separation of the bead from the tire if such be deemed necessary. Means are further provided to remove the usual bead locking ring from the wheel prior to removing the tire therefrom

DESCRIPTION OF THE PREFERRED EMBODIMENT

Figure 1:
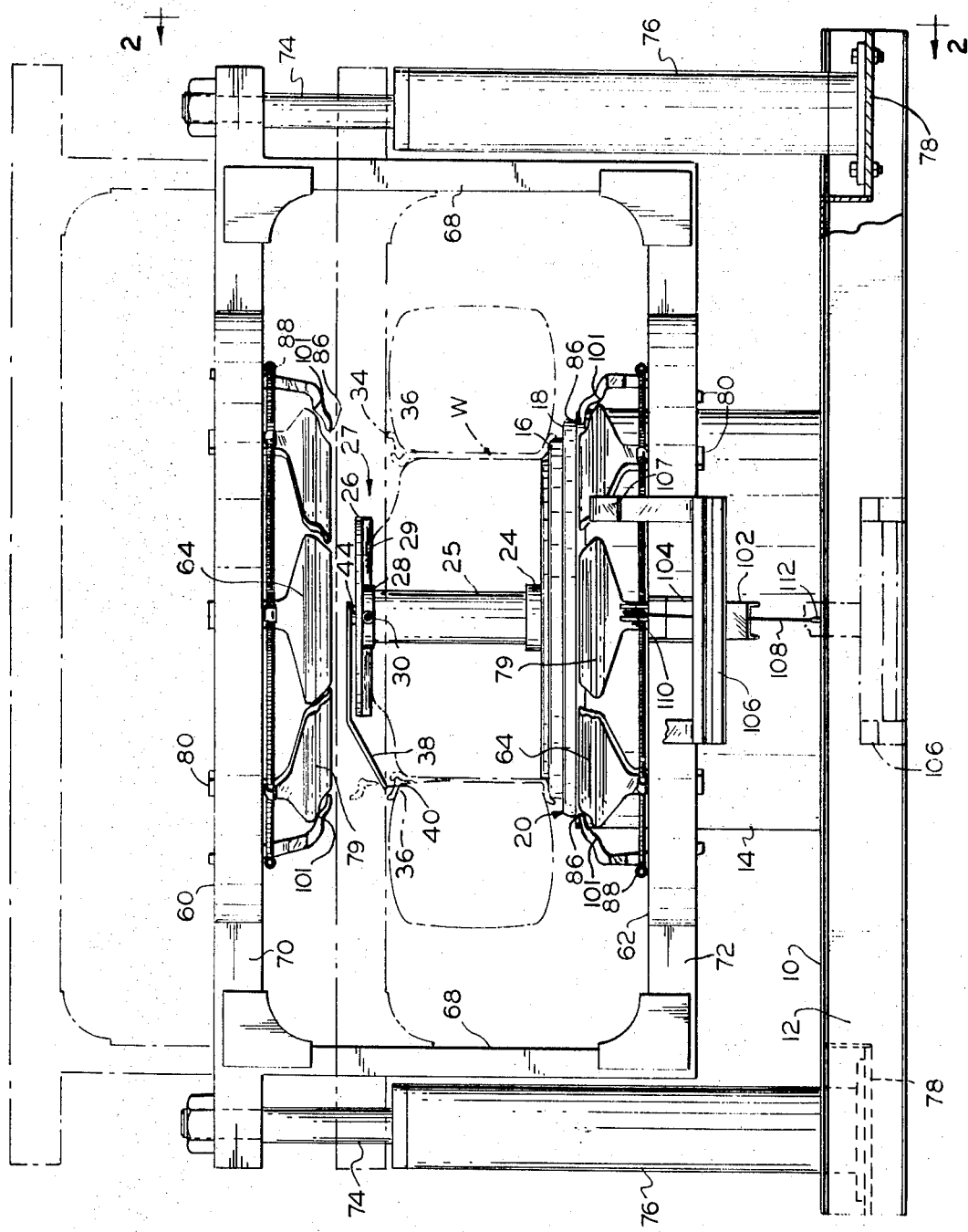
FIG. 1 is a front elevational view of the tire removing apparatus of the present invention.

Referring to the drawings, the apparatus comprises a base plate 10 mounted on two longitudinally extending I-beams 12. Positioned centrally on the plate 10 is a cylindrical drum 14 to the top of which is welded an annular seat 16 having several radial steps 18 to accommodate wheels of various diameters. The drum 14 and seat 16 form a pedestal 20 on which the wheel is mounted.

A vertically oriented cylindrical tube 21 is centrally supported in the pedestal 20 by means of four radially extending plate members 22 welded thereto. The tube 21 is exteriorly threaded as at 23 thereby to be attachable to an internally threaded sleeve member 24 welded to another tube 25. An annular plate 26 and an adapter 27 are welded to the top of tube 25. The adapter 27 is designed to secure the wheel to the pedestal 20 and comprises a hub 28 to which are attached four radially extending tubular members 29 in each of which a rod 30 is slideably received. The rods 30 are adapted to slide out from the members 29 to make contact with the outer rim when a centerless rim is involved. After the wheel is placed on the appropriate step 18 of the seat 16 and the adapter 27 is adjusted as necessary, the plate 26 is rotated to engage the internal threads on the sleeve member 24 with the external threads on the tube 21 and clamp the wheel in place.

The apparatus also desirably comprises means to remove the usual locking ring 34 which holds the bead 36 of the tire to the wheel W. Such means comprise a bent plate 38, the exterior end 40 of which is inclined inwardly of the apparatus such that it can fit underneath the ring 34 once the end of such has been pried up. Plate 38 is welded to the top 42 of a removable rod 44 which is rotatably received within the center portion of the plate 26 and adapter hub 28. Rod 44 is in turn keyed as at 46 to a shaft 48 mounted in bearings 50 interiorly of the tube 21. Shaft 48 is in turn driven through bears 56 by a hydraulic motor 52 mounted on a support 54 within the drum 14. Once the exterior end 40 of the plate 38 is positioned underneath the raised end of the locking ring 34, rotation of the rod 44 and shaft 48 causes the end 40 circumferentially to pass beneath the ring 34 to lift the same from the wheel W. Of course, the plate 38 and rod 44 are removed from the tubes 24 and 25 after the ring 34 is removed and prior to breaking the beads 36 loose from the rim.

Figure 2:
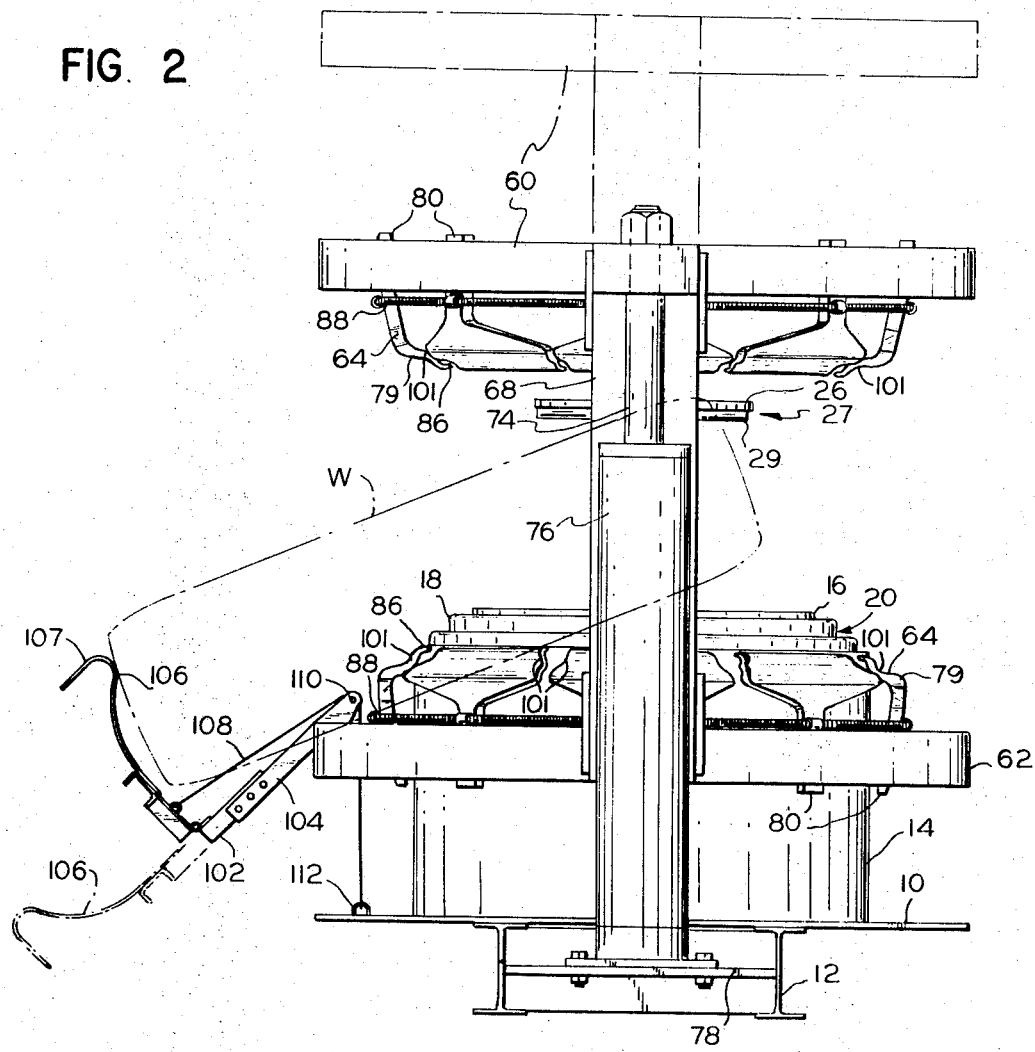
FIG. 2 is a side elevational view taken on line 2-2 of FIG. 1. Apparatus to lift a tire and wheel onto the pedestal means is illustrated in this view in two positions, the position shown in phantom being shown at the start of lifting, and the position in full line being the position the apparatus takes when the tire is elevated and partially mounted on the pedestal means.
Figure 3:
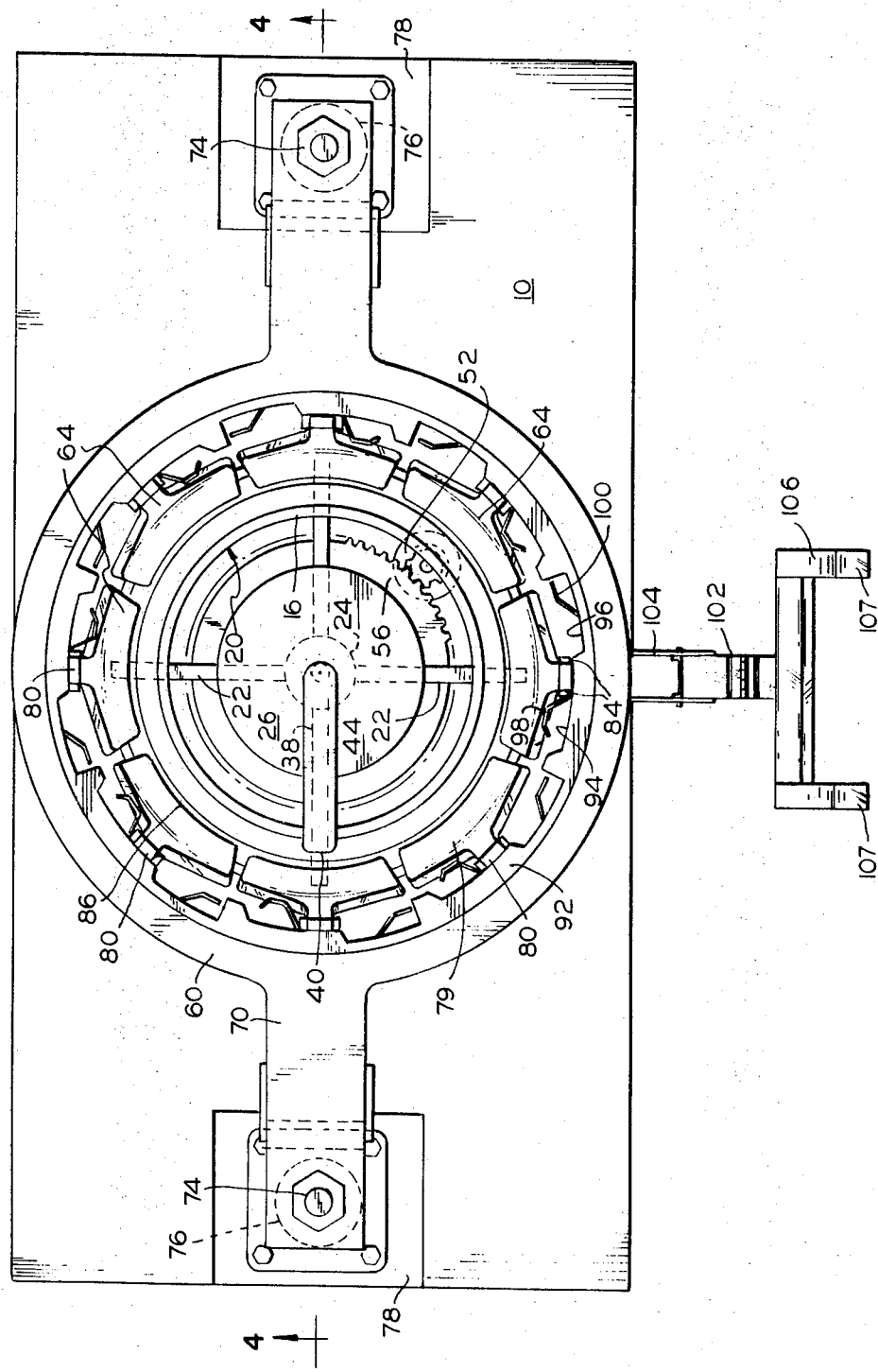
FIG. 3 is a top plan view of the apparatus of the present invention.
Figure 4:
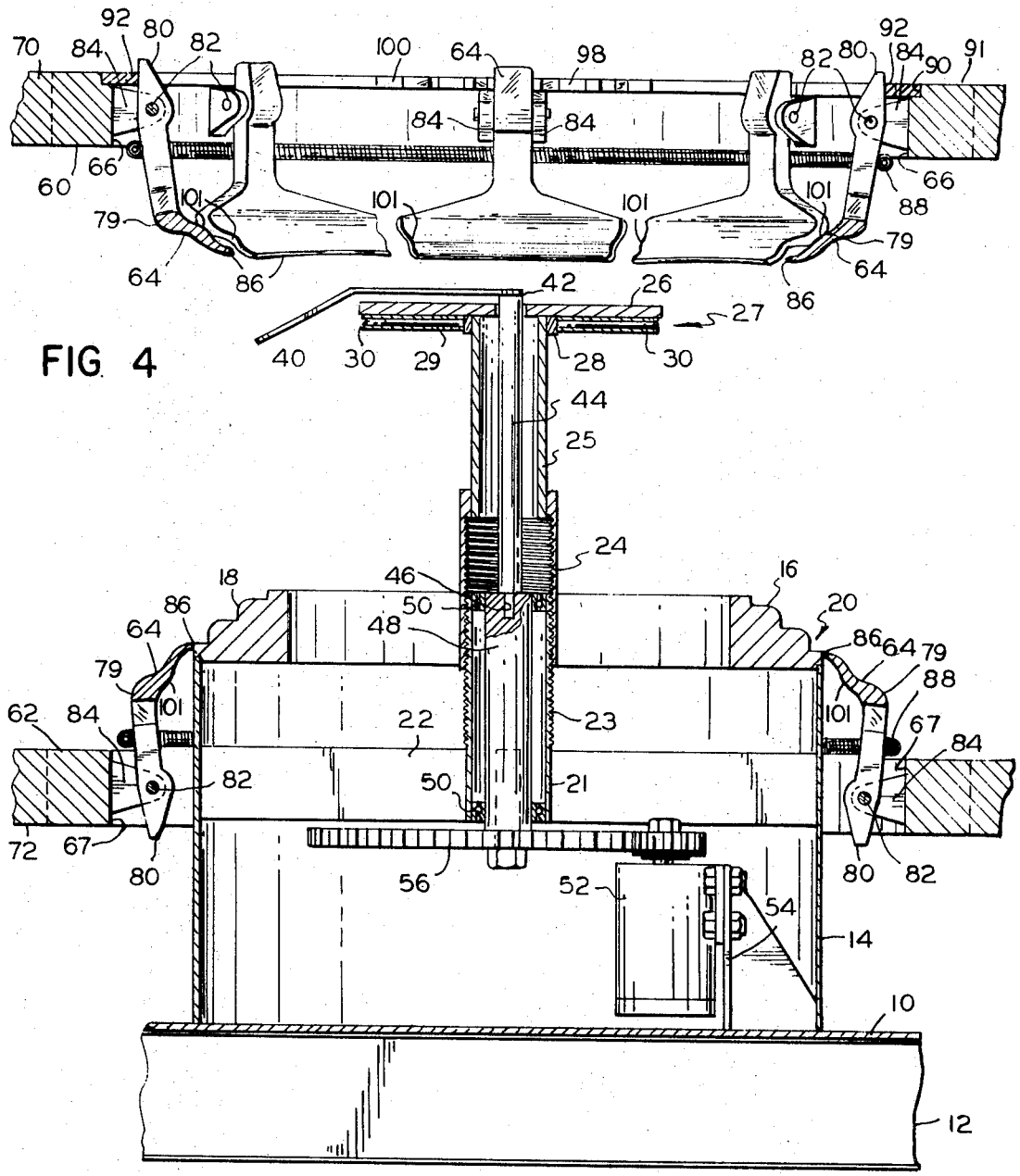
FIG. 4 is a sectional view taken on line 4-4 of FIG. 3.

A feature of the invention resides in the provision of a pair of parallel spaced coaxial pressure rings 60, 62 having a plurality of ring segments or fingers 64 pivotally mounted on the inner peripheral surfaces 66, 67 thereof. The rings 60, 62 are raised and lowered in fixed parallel spaced relation to separate the beads 36 from the rim. The rings 60, 62 are welded together by a connecting link 68 at each end of the apparatus to form a unitary structure. The rings 60, 62 are further supported by extensions 70, 72 which are carried on piston rods 74 received within hydraulic cylinders 76 mounted on plates 78 supported by the I-beams 12 at each end of the apparatus (see FIGS. 1 and 2). The cylinders 76 are provided with fluid under pressure to raise and lower the rods 74 by means of a hydraulic system not shown.

Each of the ring segments or fingers 64 comprises a reversely curved interiorly directed bead contacting portion 79 and an exterior integral arm 80 pivotally mounted on a pin 82 supported by brackets 84. Thus the segments or fingers 64 can pivot on the pins 82 such that the ends 86 of the interior portions 79 can move in the radial direction of the apparatus as will be hereinafter described. A circular coil spring 88 surrounds both the top and bottom segments or fingers 64 peripherally thereof, applying bearing pressure interiorly of their points of pivotal mounting, thereby to urge the bead contacting interior ends 86 thereof radially inwardly.

An annular slot 90 is cut in the inner peripheral surface 66 of the upper ring 60 adjacent the upper surface 91 thereof and above the brackets 84. An indexing ring 92 is positioned within slot 90, such that the exterior arms 80 of the fingers 64 bear against the indexing ring 92. The ring 92 has a plurality of bearing surfaces 94, 96 against which the arms 80 rest. Although two such surfaces 94, 96 are illustrated, it should be obvious that more could be provided. Rotating the ring 92 in the slot 90 thus provides a means for selectively adjusting the outward radial locations of the arms 80, thereby to determine the radial positions of their bead contacting portions 79. Such makes it possible for the fingers 64 on the upper ring 60 to fit wheel rims of different radial dimensions.

A radially extending spring 98, 100 is riveted or otherwise affixed to each of the surfaces 94, 96, respectively, of the ring 92. The arms 80 of the fingers 64 may be positioned against the springs 98, 100 in those instances where it is desired to permit the bead contacting portions 79 of the fingers 64 to move radially inwardly during the separation of the upper bead 36 from the rim.

It should be noted that no indexing ring is provided for the lower pressure ring 62. The fingers 64 mounted on that ring are guided by their sliding contact with the sides of the drum 14 until their bead contacting portions 79 reach the seat 16. At that point the bead contacting portions 79 can follow the contour of the seat 16 as they slide between the bead 36 and the rim.

The reversely curved cross sections of the bead contacting portions 79 of the fingers 64 are helpful in both strengthening the fingers and in separating the bead from the rim. The reversely curved portion 101 shears the bead 36 away from the rim as the fingers 64 move along the rim. In the apparatus herein illustrated, a total of eight ring segments or fingers 64 are provided on each of the pressure rings 60, 62. With this number, the fingers can contact substantially the entire bead area of the tire as the same is pried away from the rim.

The apparatus is also provided with means to help lift the wheel onto the pedestal 20. Such means comprise an arm 102 pivotally mounted in a bracket 104 on the lower ring 62, to the end of which arm is hinged a wheel-receiving lifting bracket 106 contoured to fit a tire and having reverse bent portions 107 for use as handgrips in placing the wheel on the pedestal. A cable 108 is attached to the lifting bracket 106. Cable 108 passes over a sheave 110 mounted on the lower pressure ring 62 and is anchored at 112 to the base plate 10.

OPERATION OF THE APPARATUS

The operation of the apparatus in the demounting of a heavy duty tire from a wheel is as follows. The piston rods 74 are first lowered within the cylinder 76 to lower the rings 60, 62 into near contact with the base plate 10. This permits the hinged lifting bracket 106 on the arm 102 to be lowered to receive the wheel. The rods 74 are then raised to lift both the rings 60, 62 to the position shown in the solid lines in FIG. 2, which causes the cable 108 to lift the bracket 106 and thereby the wheel to the phantom line position illustrated. The tire and wheel can then be manually positioned on the appropriate step 18 of the seat 16.

If the wheel has a centerless rim, the rods 30 in the adapter 27 are extended so that they can exert pressure on the rim. If the wheel has a standard rim, the rods 30 are maintained fully received within the tubular members 29. Once this adjustment has been made, the plate 26 and adapter 27 are placed in position with the tube 25 and sleeve 24 passing through the center of the wheel so that the internal threads on the sleeve member 24 engage the external threads on the tube 21. Rotation of the plate 26 clamps the wheel in position onto the seat 16.

The end of the locking ring 34 is pried up and the plate 38 is positioned underneath it. The rod 44 and shaft 48 are then rotated by the hydraulic motor 52 to rotate the end 40 of the plate 38 underneath the ring 34, thereby to lift the same from the wheel. Following removal of the locking ring 34, the plate 38 and rod 44 are removed from the apparatus.

The position of the indexing ring 92 is then adjusted within the slot 90 so that the bead contacting portions 79 of the fingers 64 assume the proper radial position with respect to the bead 36 of the tire. If the wheel is of the type wherein the bead is to be broken loose solely by vertical movement of the fingers 64, the arms 80 are positioned so that they bear directly against the appropriate surface 94 or 96. If, however, an inwardly directed radial motion of the bead contacting portion 79 is desired, the arms 80 are positioned against the springs 98 or 100 depending on the size of the wheel. Once the position of the indexing ring has been set, the piston rod 74 is lowered, carrying with it both the upper ring 60 and the lower ring 62 in fixed parallel spaced relation. Such lowering of the upper pressure ring 60 causes the fingers 64 mounted thereon to exert a uniform pressure to free the bead 36 of the tire from the rim of the wheel, contacting substantially the entire bead area of the tire and separating the bead from the rim on the top side thereof. During this motion, the fingers 64 on the lower pressure ring 62 merely slide downwardly against the sides of the drum 14.

After the bead has been separated from the rim on the top side of the tire, hydraulic fluid is introduced into the cylinders 76 to raise the rods 74 and thereby the pressure rings 60, 62. The fingers 64 on the lower ring 62 then slide up the sides of the drum 14 following the contour of the seat 16 until they make contact with the bead 36 on the bottom side of the tire. The bead contacting portions 79 of these lower fingers 64 then free the bead from the rim, separating the two. Continuing the upward motion of the rings 60, 62 causes the fingers 64 on the lower ring 62 actually to lift the tire from the wheel, completing the separation.

It should be noted that during both the lowering and the raising motion of the rings 60, 62, the pressure exerted by the coil springs 88 on the fingers 64 continually maintains the bead contacting portions 79 thereof in contact with their respective beads.

In order to remove heavy duty tires from rims of all sizes, I have found that the hydraulic system should be capable of causing the piston rods 74 to exert 80,000 pounds of force up or down as the case may be on each of the rings 60, 62. I have also found that the apparatus desirably should have a 7½ inch downward stroke to break the top bead loose from the rim and a 20 inch upward stroke to break the bottom bead loose from the rim and complete the separation of the tire from the wheel.

The apparatus can also be used to mount a tire on a rim and replace the locking ring 34. After doing this the locking ring 34 can be safely restrained in position by the adapter 27 while the tire is being inflated merely by sliding the rods 30 out from the members 29. If a California rim is used, this is achieved by lowering the upper ring 60 such that the fingers 64 thereon are placed in position against the rim, thereby maintaining the locking ring in position during inflation of the tire.

I claim:

1. Apparatus for removing a tire from a wheel comprising pedestal means upon which a wheel with a tire thereupon can be mounted;
    means for securing said wheel to said pedestal means;
    a pair of parallel spaced pressure rings mounted in coaxial circumscribing relation to said pedestal means;
    a plurality of fingers pivotally mounted on the inner peripheral surfaces of each of said rings, said fingers being adapted to exert pressure on the beads of said tire to free the same from the rims of said wheel, said fingers being adapted to contact substantially the entire bead area of said tire while exerting said pressure; and
    means to move said rings axially relative to said pedestal means to cause the fingers on one of said rings first to separate one of the beads of said tire from the rim on one side of said tire, and the fingers on the other of said rings subsequently to separate the other of the beads of said tire from the rim on the other side of said tire and then lift said tire from said wheel.

2. Apparatus as in claim 1 in which the bead contacting portions of said fingers are reversely curved to assist in separating the beads from the rim.

3. Apparatus as in claim 1 in which said pressure rings comprise a unitary structure.

4. Apparatus as in claim 1 further comprising peripheral spring means disposed exteriorly of said fingers and bearing thereagainst, said peripheral spring means being located interiorly of the points of pivotal mounting of said fingers to urge the bead contacting portions of said fingers radially inwardly.

5. Apparatus as in claim 4 further comprising
    an annular slot in the inner peripheral surface of said upper pressure ring;
    an indexing ring mounted in said slot and against which the upper parts of said fingers are adapted to bear,
    said indexing ring having a plurality of bearing surfaces for selectively adjustable contact with said upper parts of said fingers, thereby selectively to determine the radial position of said bead contacting portions of said fingers to fit wheel rims of different radial dimensions.

6. Apparatus as in claim 5 further comprising radially extending spring means disposed on said indexing ring and against which said upper parts of said fingers are adapted to bear to permit said bead contacting portions of said fingers to move radially inwardly during separation of said bead from said rim on said top side of said tire.

7. Apparatus as in claim 1 in which said wheel securing means comprise an annular plate adapted to sit upon the top side of said wheel, and means removably to secure said plate to said pedestal means.

8. Apparatus as in claim 7 in which said plate securing means comprise
   a first vertical tube to which said plate is attached, said first tube extending interiorly of said pedestal means;
   a second vertical tube disposed within said pedestal means, said first and second tubes being threadedly engageable; and
   means securing said second vertical tube to said pedestal means.

9. Apparatus as in claim 8 further comprising
   means to remove a bead locking ring from said wheel, said bead locking ring removing means comprising
   a generally horizontal rotatable member, the exterior end of which is adapted to fit beneath said locking ring;
   a rod removably disposed centrally of said vertical tubes, said rotatable member being attached to the top of said rod, and
   means disposed within said pedestal means to rotate said rod about its axis and cause said exterior end of said rotatable member circumferentially to pass beneath said locking ring to lift the same from said wheel.

10. Apparatus for removing a tire from a wheel comprising:
    a cylindrical drum;
    an annular seat mounted on said drum, said seat being adapted to support a wheel with a tire thereupon;
    a first vertical tube centrally supported within said drum;
    a second vertical tube disposed above said first tube and adapted to be removably attached thereto;
    an annular plate attached to the top of said second tube, said plate and said second tube being adapted to secure said wheel to said seat;
    a bead locking ring removing plate having an exterior end portion adapted to fit beneath the bead locking ring of said wheel;
    a rod removably disposed centrally of said first and second vertical tubes, said bead locking removing plate being attached to the top of said rod;
    motor means disposed within said drum and adapted to rotate said rod about its axis to cause said exterior end of said bead locking ring removing plate circumferentially to pass beneath said bead locking ring to lift the same from said wheel;
    a pair of parallel, spaced pressure rings mounted in coaxial circumscribing relation to said drum;
    an extension formed on each side of each of said rings;
    a connecting link joining said extensions on each of said sides thereof, said links forming a unitary structure of said rings;
    means to move said rings in fixed parallel spaced relation axially relative to said drum;
    a plurality of fingers pivotally mounted on the inner peripheral surfaces of each of said rings, said fingers being adapted to exert pressure on the beads of said tire to free the same from the rims of said wheel, said fingers being adapted to contact substantially the entire bead area of said tire while exerting said pressure, said fingers being reversely curved to assist in separating said beads from said rim;
    spring means disposed exteriorly of said fingers and bearing thereagainst, said spring means being located interiorly of the points of pivotal mounting of said fingers to urge the bead contacting portions thereof radially inwardly;
    an annular slot formed in the inner peripheral surface of said upper pressure ring;
    an indexing ring mounted in said slot and against which the upper parts of said fingers are adapted to bear, said indexing ring having a plurality of bearing surfaces for selectively adjustable contact with said upper parts of said fingers selectively to determine the radial positions of said bead contacting portions of said fingers to fit wheel rims of different radial dimensions; and
    a radially extending spring attached to each of said bearing surfaces of said indexing ring against which springs said upper parts of said fingers selectively may be positioned to bear to permit said bead contacting portions thereof to move radially inwardly during separation of said beads from said rim on at least one side of said tire;
    whereby movement of said pressure rings axially relative to said drum causes said fingers on one of said pressure rings first to separate one of the beads of said tire from said rim on one side thereof and the fingers on the other of said rings subsequently to separate the other of the beads from said rim on the other side of said tire.

UNITED STATES PATENT OFFICE
CERTIFICATE OF CORRECTION

Patent No. 3,581,795      Dated June 1, 1971

Inventor(s) G. W. Bunch, Jr., et al.

It is certified that error appears in the above-identified patent and that said Letters Patent are hereby corrected as shown below:

On the cover sheet [73] "assignor to said Johnson, by said Bunch" should read -- assignor to said Bunch, by said Johnson --.

Signed and sealed this 30th day of November 1971.

(SEAL)
Attest:

EDWARD M. FLETCHER, JR.      ROBERT GOTTSCHALK
Attesting Officer      Acting Commissioner of Patents